(12) United States Patent
Castorina et al.

(10) Patent No.: US 7,881,554 B2
(45) Date of Patent: Feb. 1, 2011

(54) METHOD FOR CORRECTING A DIGITAL IMAGE

(75) Inventors: Alfio Castorina, Linera (IT); Raimondo Schettini, Milan (IT); Francesca Gasparini, Milan (IT); Silvia Corchs, Lomazzo (IT); Alessandro Capra, Gravina di Catania (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 861 days.

(21) Appl. No.: 11/422,208

(22) Filed: Jun. 5, 2006

(65) Prior Publication Data

US 2007/0279500 A1 Dec. 6, 2007

(51) Int. Cl.
G06K 9/40 (2006.01)
(52) U.S. Cl. ................ 382/274; 382/264; 382/272
(58) Field of Classification Search ........... 382/270, 382/272, 274; 348/254
See application file for complete search history.

(56) References Cited

U.S. PATENT DOCUMENTS 6,741,753 B1 5/2004 Moroney .............. 382/274
7,146,059 B1 * 12/2006 Durand et al. ........... 382/260

OTHER PUBLICATIONS

Giuseppe Messina et al Image Quality Improvement by Adaptive Exposure Correction Techniques ICME/IEEE 2003.*
Paul Debevec et al High Dynamic Range Imaging SIGGRAPH 2004.*
Sylvain Paris et al A gentle introduction to Bilateral Filtering and it's applications SIGGRAPH 2007.*
Nathan Moroney Local Color Correction Using Non-Linear Masking Eigth Color Imaging Conference, 2000.*
Sakaue et al., Adaptive gamma processing of the video cameras for the expansion of the dynamic range?, IEEE Trans. On Consumer electronics, vol. 41, pp. 555-562, 1995.
Wang et at "Image enhancement based on equal area dualistic sub-image histogram equalization method", IEEE Trans. On Consumer Electronics, vol. 45, pp. 68-75, 1999.
Chiu et al., "Spatially nonuniform scaling functions for high contrast images", Proc. Graphics Interface '93, pp. 245-254, 1993.
Tumblin et al., "LCIS: A boundary hierarchy for detail preserving contrast reduction", SIGGRAPH 99, pp. 83-90, 1999.
Battiato et al., "High dynamic range imaging for digital still camera: an overview", Journal of Electronic Imaging, vol. 12, pp. 459-469, 2003.

(Continued)

*Primary Examiner*—Wes Tucker
*Assistant Examiner*—Mark Roz
(74) *Attorney, Agent, or Firm*—Lisa K. Jorgenson; Allen, Dyer, Doppelt, Milbrath & Gilchrist, P.A.

(57) ABSTRACT

A luminance intensity of pixels of an input digital image is corrected for generating a corrected digital image. A luminance of each pixel is calculated as a function of the luminance of a corresponding pixel in an original image according to a parametric function. A mask of the input digital image to be corrected is generated according to a bilateral filtering technique. For each pixel of the input digital image, a respective value of at least one parameter of the parametric function is established based upon the luminance of a corresponding pixel of the mask.

34 Claims, 5 Drawing Sheets

OTHER PUBLICATIONS

Pattanik et al., "A multiscale model of adaptation and spatial visual for realistic image display", SIGGRAPH 98, pp. 287-298, 1998.

Jobson et al., A multiscale retinex for bridging the gap between color images and the human observation of scenes?, IEEE Trans. On Image Processing, vol. 6, pp. 965-976, 1997.

Rahman et al., "Multiscale retinex for color image enhancement", Proc. International Conference on Image Processing, vol. 3, pp. 1003-1006, 1996.

Rizzi et al., A new algorithm for unsupervised global and local color correction, Pattern Recognition Letters, vol. 24, pp. 1663-1677, 2003.

Fairchild et al., "Meet iCAM: An image color appearance model", IS&T/SID $10^{th}$ Color Imaging Conference, Scottsdale, 2002.

Tomasi et al., "Bilateral filtering for gray and color images", Proc 1998, IEEE Int. Conf. on Computer Vision, pp. 836-846, 1998.

\* cited by examiner

METHOD FOR CORRECTING A DIGITAL IMAGE

FIELD OF THE INVENTION

The present invention relates in general to image processing, and more particularly, to a method for a local contrast correction of a digital image.

BACKGROUND OF THE INVENTION

In the field of image processing for image enhancement, several methods for adjusting image contrast have been developed. Among the best known image enhancement techniques are the gamma correction and the histogram equalization technique.

The gamma correction technique is a simple exponential correction, and is commonly implemented in image processing. The histogram equalization technique has been proposed by different authors. Starting from the original grey level distribution of the image, the original image histogram is reshaped into a different one of uniform distribution to increase contrast.

Numerous improvements have been made to simplify equalization by introducing models of perception. Frei [4] introduced histogram hyperbolization that attempts to redistribute perceived brightness rather than grey levels. Frei approximated brightness using the logarithm of the luminance.

Other authors (for example, Mokrane [5]) have introduced methods that use more sophisticated models of perceived brightness and contrast. Wang et al. [6] proposed an equal area dualistic sub-image histogram equalization. First, the image is decomposed into two sub-images of equal area based on its original probability density function. Then, the two sub-images are singularly equalized. The processed sub-images are merged into one image. The authors have applied this technique in video systems.

In general, there are two classes of contrast correction techniques: global and local correction techniques. Let us consider a scene of a room illuminated by a window that looks out on a sunlit landscape. A human observer inside the room can easily see individual objects in the room, as well as features in the outdoor landscape. This is because our eyesight adapts itself locally as we scan the different regions of the scene.

If we attempt to photograph the same scene, the result could be disappointing. Either the window is overexposed and we can hardly see outdoor detail, or the interior of the room is under-exposed and looks dark.

Global contrast correction techniques produce the same disappointing results since it is difficult to accommodate both shadowed and highlighted detail. The advantage of the local contrast correction techniques is that they provide a method to map one input value onto many different output values, depending on the values of the neighboring pixels, thus allowing for simultaneous lowlight and highlight adjustments.

Different algorithms of local contrast correction have been proposed. The photographers' practice of "dodging and burning" to locally adjust print exposure in a darkroom, inspired an early paper by Chiu et al. [7] disclosing the construction of a locally varying attenuation factor M by repeatedly clipping and low-pass filtering the scene. Their method works well in smoothly shaded regions.

Larson et al. [8] presented a tone reproduction operator that preserves visibility in high dynamic range scenes. They introduced a new histogram adjustment technique, based on the population of local adaptation luminances in a scene.

Tumblin and Turk [9] devised a hierarchy that closely follows artistic methods for scene renderings. Each level of hierarchy is made from a simplified version of the original scene made of sharp boundaries and smooth shadings. They named the sharpening and smoothing method low curvature image simplifiers or LCIS. This technique proved itself effective in converting high contrast scenes to low contrast, highly detailed display images.

Battiato et al. [10] presented a collection of methods and algorithms able to deal with high dynamic ranges of images. All techniques rely on using differently exposed pictures of the same scene to enhance the usual 8-bit depth representation of pictures.

Pattanik et al. [11] developed a computational model of adaptation spatial vision for tone reproduction. Their model is based on a multiscale representation of pattern, luminance and color processing in the human visual system.

Jobson et al [12] and Rahman et al. [13] devised a contrast reduction method in accordance with Land's Retinex theory of lightness and color adaptation. They presented a multiscale Retinex that simultaneously achieves enhanced color rendition and dynamic range performances.

Rizzi et al. [14] presented an algorithm for digital images unsupervised enhancement with simultaneous global and local effects, called ACE for Automatic Color Equalization. Inspired by some adaptation mechanisms of human vision, it realizes a local filtering effect by taking into account the color spatial distribution in the image. ACE proved to achieve an effective color constant correction and a satisfactory tone equalization by simultaneously performing global and local image corrections. However, the computational cost of the algorithm is very high.

Fairchild and Johnson [15] formulated a model called iCAM (image Color Appearance Model). The objective was to provide traditional color appearance capabilities, spatial vision attributes and color difference metrics in a simple model for practical applications, such as high dynamic range tone mapping, for example.

U.S. Pat. No. 6,741,753 to Moroney discloses a device and a method of color correction, wherein a mask is obtained from the image data. This mask is used for converting the image data in a color correction apparatus. The method involves the mask being derived from image data in a first pixel representation, and is used to convert the image data into a perceptual color space representation that is a function of a background luminance parameter. When converting the image data pixel-by-pixel into the perceptual color space representation, localized color correction is obtained by using varying mask values as the background luminance parameter for each pixel conversion.

Moroney [2] uses non-linear masking to perform local contrast correction. This correction can simultaneously lighten shadow areas and darken highlight areas and it is based on a simple pixelwise gamma correction of the input data. However, one of the limitations of Moroney's algorithm (common also to other local correction techniques) is the introduction of halo artifacts which are due to the smoothing across scene boundaries.

SUMMARY OF THE INVENTION

In view of the foregoing background, an object of the present invention is to provide a method for correcting the contrast of a picture that operates pixelwise while addressing the above drawbacks.

This and other objects, advantages and features in accordance with the present invention are obtained by calculating the luminance intensity of each pixel of the corrected image depending on the luminance of the corresponding pixel in the input image to be corrected by using a pre-established parametric formula. The value of the parameter (or of at least one parameter) of this formula is determined pixelwise as a function of the luminance intensity of a corresponding pixel of a mask obtained by bilateral low-pass filtering the original image.

The technique is advantageously effective in enhancing the contrast of the input image while preserving contours of objects depicted therein, and preventing the generation of halo artifacts.

According to one embodiment of the invention, this parametric formula corresponds to an adaptive exponential correction. The adaptive exponential correction may be a gamma correction.

Preferably, the color saturation of the corrected image is adjusted for generating the final image. The method may be conveniently implemented through a software code executed by a computer.

BRIEF DESCRIPTION OF THE DRAWINGS

The invention will be described in detail referring to the enclosed drawings, wherein:

FIG. 5b shows a bilateral filter mask used for obtaining the picture of FIG. 5a;

FIG. 6b shows the Gaussian filter mask used for obtaining the picture of FIG. 6a;

FIG. 11b shows the histogram of the image of FIG. 11a;

FIG. 12b shows the histogram of the picture of FIG. 12a;

FIG. 13b shows the histogram of the picture of FIG. 13a;

FIG. 14b shows the histogram of the picture of FIG. 14a;

FIG. 15b shows the histogram of the picture of FIG. 15a;

FIG. 16b shows the histogram of the picture of FIG. 16a.

DETAILED DESCRIPTION OF THE PREFERRED EMBODIMENTS

Figure 1:
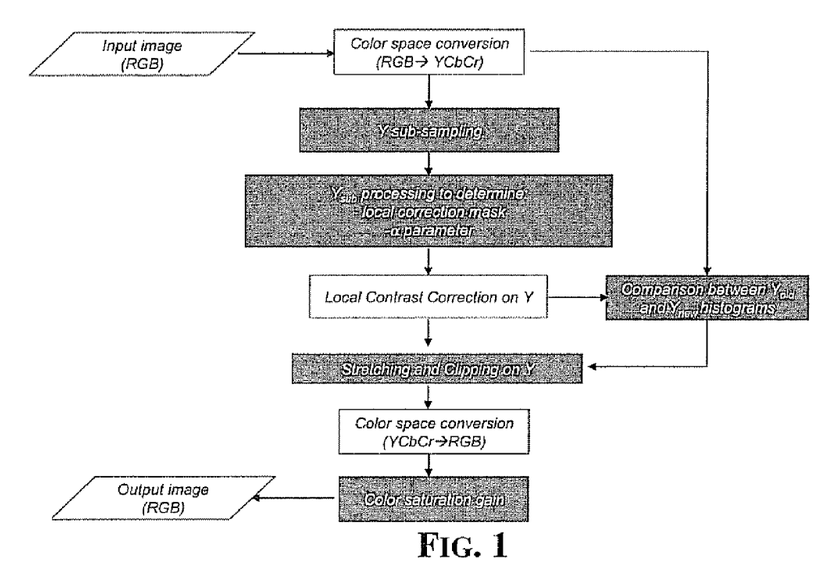
FIG. 1 is a flow chart of a preferred embodiment in accordance with the present invention.

FIG. 1 is a process flow chart according to the preferred embodiment in accordance with the present invention for correcting the contrast of a picture. The different steps of the method are with respect to the method disclosed in U.S. Pat. No. 6,741,753 are highlighted using a dark shading.

From each pixel of an input image to be corrected, which may be an RGB picture or a picture of a different kind, the luminance Y and chrominance components Cb and Cr are extracted. The next operation of Y sub-sampling includes scaling down the converted image to reduce the complexity of the algorithm. This operation is different from the analogous step in Moroney's method, wherein the input images are scaled down to a fixed size format (for example, 120×160) before carrying out the correction operations.

In contrast, the scale factor of the image remains constant in accordance with the method of the invention. Therefore, details of input pictures are preserved, independently of their size. With the prior method of Moroney, a high resolution picture is shrunk to an extent that certain details (especially borders of objects) may be corrupted or even completely lost.

To better understand the differences between Moroney's method and the method of the invention, a common local contrast correction technique is briefly described.

The Gamma Correction

The gamma correction is an exponential correction commonly included in image processing algorithms and includes processing the input image through a constant power function, with exponent γ.

Let us assume for simplicity a grey image I(i,j). The gamma correction transforms each pixel I(i,j) of the input image into the output O(i,j), according to the following rule:

$$O(i, j) = 2^{n-1} \left( \frac{I(i, j)}{2^{n-1}} \right)^{\gamma} \tag{1}$$

where γ is a positive number selected in accordance with the original luminance and the desired strength of correction to be applied. The variable n represents the bit depth of the image, that is, the number of bits used to represent a pixel value.

Obviously, if the input picture is a color picture, the quantities I(i,j) and O(i,j) represent the luminance of the input and of the output image, respectively. This correction gives good results for totally underexposed or overexposed images. However, when both underexposed and overexposed regions are simultaneously present in an image, this correction is unsatisfactory.

Figure 2:
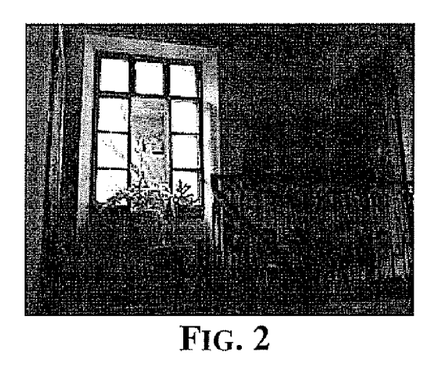
FIG. 2 shows a picture with over-exposed and under-exposed zones in accordance with the present invention.
Figure 3:
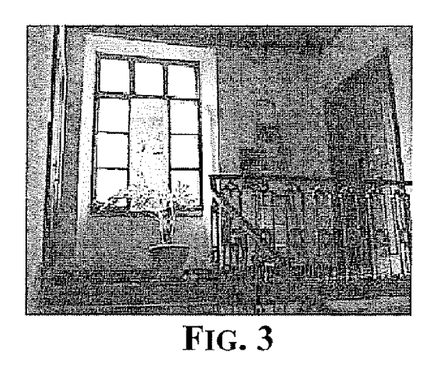
FIG. 3 is a replica of the image of FIG. 2 corrected in accordance with the present invention based upon a gamma correction for γ=0.35.

In the image represented in FIG. 2, the region of the window is well illuminated whereas the rest of the photo is too dark to see the details. By applying the gamma correction, the underexposed regions will become lighter as desired (making noticeable the details) but the central region of the photo will appear overexposed. This is evident in FIG. 3, wherein the luminance of each pixel has been processed using equation (1) using the following sample values:

γ=0.35 and n=8.

For the case of an image that has only certain regions with a correct illumination and other regions that are not well exposed, a local correction would be needed for making distinct shadow and highlight adjustments.

For a local correction, the exponent of the gamma correction will not be a constant but instead will be chosen as a function that depends on the pixel (i,j) to be corrected and on its neighboring pixels N(i,j). Equation 1 thus becomes:

$$O(i, j) = 2^{n-1}\left(\frac{I(i, j)}{2^{n-1}}\right)^{\gamma(i,j,N(i,j))} \quad (2)$$

Moroney [2] suggested the following expression for the exponent:

$$\gamma(i, j, N(i, j)) = 2^{\left(\frac{M-mask(i,j)}{M}\right)} \quad (3)$$

where mask(i,j) is an inverted Gaussian low-pass filtered version of the intensity of the input image.

Mask values greater than M, corresponding to dark pixels with dark neighboring pixels in the original image, will generate exponents γ smaller than 1 (equation 3), and therefore, from equation 2, an increase of the luminance will be observed. Vice-versa, values smaller than M, corresponding to bright pixels with bright neighboring pixels in the original image, will generate exponents γ greater than 1 and a decrease of the luminance. Mask values equal to M will produce an exponent equal to one thus leaving the original input unmodified. The greater the distance from the mean value M, the stronger the correction introduced. It should be noted that the white and black pixels remain unaltered independently on the value of the exponent γ.

Differently from the method of Moroney, the gamma correction according to the method of the invention is carried out with the following equation:

$$\gamma(i, j, N(i, j)) = \alpha^{\left(\frac{M-BFmask(i,j)}{M}\right)} \quad (4)$$

wherein BFmask(i,j) is a an inverted low-pass replica of the intensity of the input image, filtered with a bilateral filter (for example, of the type described in the article by Tomasi and Manduchi [16]) and α is a parameter that depends on the image properties, as will be explained below Bilateral Filtering The bilateral filtering technique preserves contours of depicted objects in a processed image, while in a Gaussian low-pass filtering this does not happen.

The Gaussian low-pass filtering computes a weighted average of pixel values in the neighborhood, in which the weights decrease with distance from the center. The assumption is that neighboring pixels of a pixel to be filtered are likely to have similar values to the latter, thus it is appropriate to average their values. However, this assumption of relatively slow spatial variations fails at edges of depicted objects, which are consequently blurred by the low-pass filtering.

The invention provides a method of correcting contrast of pictures by using a bilateral filtering technique, such as the technique disclosed in the article by Tomasi and Manduchi [16], for generating a value of the exponent γ of a gamma correction algorithm that varies as a function of the pixel to be corrected and of its neighboring pixels.

While bilateral filtering techniques have always been proposed and used for carrying out spatial filtering, the inventors have found a surprising effectiveness of bilateral filtering for generating a mask that in turn is advantageously suitable for carrying out a filtering operation in the luminance domain.

This invention will be described in detail referring to the implementation of an exponential correction of the contrast in an image, but one skilled in the art would recognize that other contrast correction techniques different from the commonly used exponential correction technique will benefit by the association of a bilateral filtering mask with other filtering techniques that are implemented in the luminance domain.

Indeed, in filtering techniques that operate in the luminance domain, there is always at least a parameter, the value of which is adjusted from time to time to correct the luminance of each pixel. The correction of such a fundamental parameter (as the γ exponent value in the common gamma correction technique) may be advantageously made as a function of the luminance of the pixel and of its neighboring pixels through a bilateral filtering mask.

As will be shown below, by using equation (4) of the invention instead of equation (3) of Moroney [2], the halo effects that are present in certain images with large luminance gradients, processed with a spatial Gaussian filter, are significantly reduced.

The preferred embodiment of the local contrast correction method is based on an algorithm for correcting locally in an exponential fashion the luminance according to the following formula:

$$O(i, j) = 2^{n-1}\left(\frac{I(i, j)}{2^{n-1}}\right)^{\alpha\left(\frac{M-BFmask(i,j)}{M}\right)} \quad (5)$$

wherein BFmask(i,j) is given by inverting the input image $$I_{inv}(i,j)=2^{n-1}-I(i,j) \quad (6)$$

and filtering each pixel of the inverted image with a bilateral low-pass filter acting over a working window of size (2K+1)×(2K+1) centered on the pixel to be filtered, that is:

$$BFmask(i, j) = \frac{1}{k(i, j)} \sum_{p=i-K}^{i+K} \sum_{q=j-K}^{j+K} e^{\left\{-\frac{1}{2\sigma_1^2}[(i-p)^2+(j-q)^2]\right\}} e^{\left\{-\frac{1}{2\sigma_2^2}[I_{inv}(i,j)-I_{inv}(p,q)]^2\right\}} I_{inv}(p, q) \quad (7)$$

where k(i,j) is the normalization factor given by:

$$k(i, j) = \sum_{p=i-K}^{i+K} \sum_{q=j-K}^{j+K} e^{\left\{-\frac{1}{\sigma_1^2}[(i-p)^2+(j-q)^2]\right\}} e^{\left\{-\frac{1}{2\sigma_2^2}[I_{inv}(i,j)-I_{inv}(p,q)]^2\right\}} \quad (8)$$

In equations 6 and 7, $\sigma_1$ is the standard deviation of the Gaussian function in the spatial domain, and $\sigma_2$ is the standard deviation of the Gaussian function in the luminance domain.

Equation (7) is substantially a weighted average and the parameters $\sigma_1$ and $\sigma_2$ determine the weight of each luminance value in the average. A larger $\sigma_1$ blurs more. That is, it combines values from more distant image locations. As $\sigma_2$ increases, the bilateral filter approaches the Gaussian low-pass filter.

The dimension K of the window depends on the shape of the spatial Gaussian function through the following relation:

$$K = \text{fix}(a \times \sigma) \qquad (9)$$

wherein fix(.) is an operator that rounds off its argument to the closest larger integer, and a is a properly determined scaling factor. This factor should be large enough to be sure that the working window substantially contains all the pixels that give a significant contribution in Equation (7), but not so large to include pixels that are too far from the central pixel (i,j). A good compromise value may be a=2.5.

If $\sigma_1$ is too large, the image results are too blurred, the exponent tends to a constant value and Equation (5) tends toward the simple gamma correction of Equation (1). Vice-versa, if the window is too small, the image is not blurred and the correction does not take into account the local properties of the image.

Figure 4:
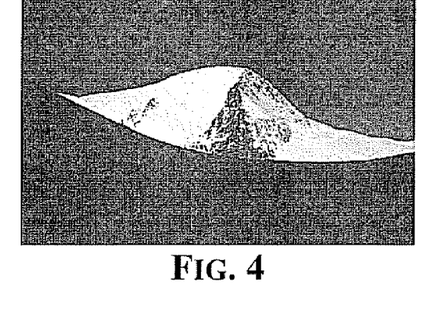
FIG. 4 shows a picture to be corrected in accordance with the present invention.

FIG. 4 depicts an image with large intensity gradients, and thus is likely to become affected by the halo effect when corrected according to the Moroney's method. For comparison purposes, this picture has been corrected according to equation (2) and (3) and according to equation (5) with the same values of $\alpha=2$, n=8, M=128 and a=2.5.

Figure 5A:
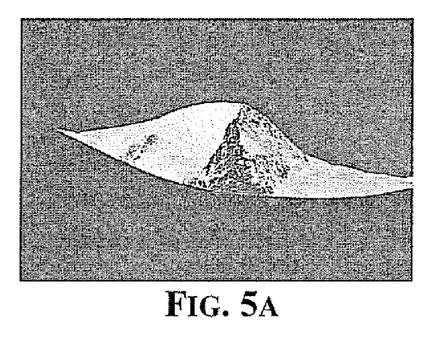
FIG. 5a is a replica of the picture of FIG. 4 corrected according to a first embodiment in accordance with the present invention.
Figure 5B:
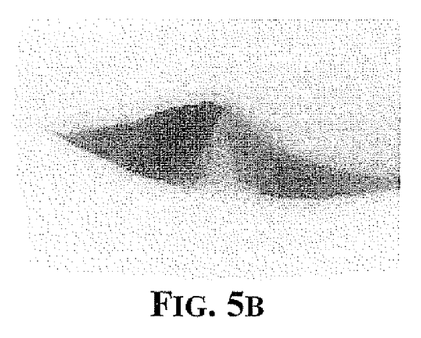
Figure 6A:
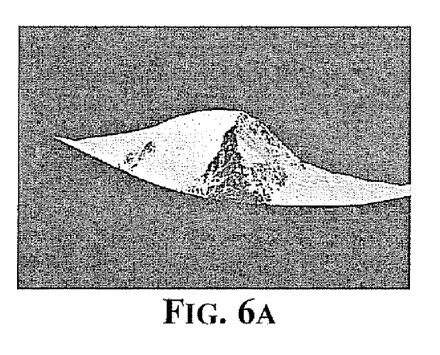
FIG. 6a is a replica of the picture of FIG. 4 corrected with a Gaussian filter.

The picture of FIG. 5a is obtained with equation (5), and FIG. 5b shows the bilateral filtering mask that is obtained. FIG. 6a shows the picture of FIG. 4 corrected according to equation (3), and FIG. 6b shows the corresponding Gaussian mask.

By comparing FIG. 5a with FIG. 6a, it is possible to notice the halo artifacts, which in FIG. 6a surround the profile of the mountain, are practically negligible in FIG. 5a.

Figure 6B:
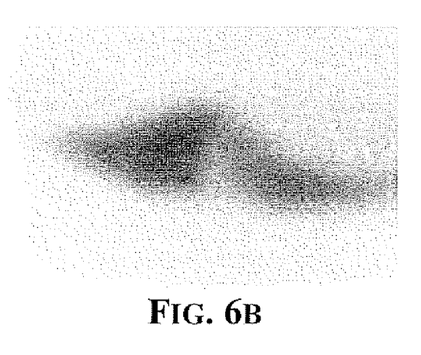

The reason for this result may be clearly understood by comparing FIGS. 5b and 6b. The bilateral filtering mask of FIG. 5b is well defined, while the Gaussian filtering mask of FIG. 6b is relatively blurred.

Different authors have followed the ideas of Tomasi and Manduchi and proposed other bilateral filtering techniques that may be used in the method of the invention instead of the Tomasi and Manduchi technique. For example, one of these techniques is disclosed in the article by Durand and Dorsey [17] that provides a theoretical framework for bilateral filtering, and also for accelerating the method by using a piece-wise-linear approximation in the intensity domain and sub-sampling in the spatial domain.

To make the bilinear filter algorithm faster, the spatial Gaussian function in equation (6) may be simply replaced by a box filter of size $v_1+1$. That is, the spatial weights of the bilateral filter are discarded and only the luminance weights are retained.

Tests carried out by the inventors showed that images corrected according to this alternative embodiment of the invention do not show relevant differences with respect to images corrected according to equation (7), but the time needed for carrying out the correction is sensibly reduced (even by a factor of 7 in the case of FIG. 2).

α Parameter Optimization

The value of the parameter $\alpha$ in equation (5) may be determined as a function of the desired result. By adjusting this parameter it is possible to obtain different contrast corrections that depend on the characteristics of the picture to be corrected. For low contrast images, where a strong correction is needed, $\alpha$ is larger than 1, for example it may range between 2 and 3, while for well contrasted images, $\alpha$ should be about 1, which does not introduce any correction.

According to the preferred embodiment of this invention, $\alpha$ is calculated automatically as a function of the expected mean luminance of the corrected image.

The function E[.] is the operator for calculating the mean luminance of an image, and equation (5) implies $$E[O(i,j)] = 2^{n-1} \times E\left[\left(\frac{I(i,j)}{2^{n-1}}\right)^{\alpha\left(\frac{M-BFmask(i,j)}{M}\right)}\right] \qquad (10)$$

If the output image should have a mean luminance intensity, in other words, if the mean luminance of the output image should be M, then $$E[O(i,j)] = 2^{n-1} \times E\left[\left(\frac{I(i,j)}{2^{n-1}}\right)^{\alpha\left(\frac{M-BFmask(i,j)}{M}\right)}\right] = M \qquad (11)$$

With $0 \leq BFmask(.,.) \leq M$, it is possible to obtain the following two estimated values for $\alpha$:

$$\alpha = \frac{\ln(\bar{I})}{\ln(M)} \quad \text{when } BFmask(.,.) = 2^{n-1} \qquad (12)$$

$$\alpha = \frac{\ln(2^{n-1})}{\ln(\bar{I})} \quad \text{when } BFmask(.,.) = 0 \qquad (13)$$

wherein $\bar{I}$ is the estimated value or mean value of the intensity of the input image.

If $\bar{I}$<M, then the input image is substantially a dark image. Therefore, the mask has more values towards to M, because this value is associated with the minimum luminance intensity of the image (image completely dark), and thus equation (12) may be used for estimating $\alpha$. Otherwise, if $\bar{I}$>M, that is, the image to be corrected is a bright image, a may be estimated with equation (13).

The parameter $\alpha$, as given by equations (12) and (13), may be also used for deciding whether contrast enhancement processing should be carried out on the original image or not. That is, if $\alpha$ is close to one (for example $\alpha<1,2$), it may be decided that the original image does not need to be processed.

Figure 7:
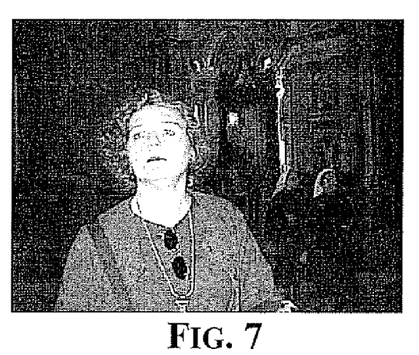
FIG. 7 shows a second picture to be corrected in accordance with the present invention.
Figure 8:
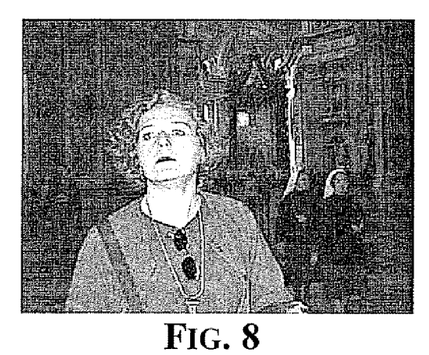
FIGS. 8 to 10 are replicas of the picture of FIG. 7 corrected according to a first embodiment in accordance with the present invention for increasing values of the parameter α (1.5, 2 and 2.6, respectively)
Figure 9:
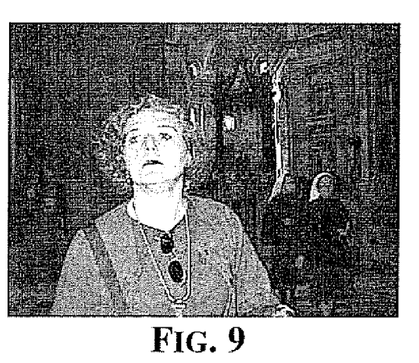
Figure 10:
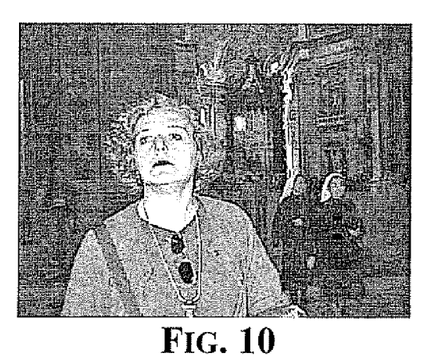

To better understand the effect of the variations of a on the corrected image, the picture to be corrected in FIG. 7 and at the corresponding corrected replicas depicted in FIGS. 8 to 10 for increasing values of $\alpha$ (1,5, 2 and 2.6, respectively) may be observed.

The value of $\alpha$ may be determined in many different ways. For example, the value M in equation (11) is the median value of the luminance intensity of a n bit image. Of course, if a different mean luminance intensity is desired, the value M may be substituted by a larger or a smaller value.

Of course different choices could be used to fix the alpha value, in particular, it would often be convenient to use multiple alpha values. For example, one could decide to use one alpha value, say ALPHA1 for pixels having a value below a given threshold T and one alpha value, say ALPHA2, for pixels having a value above the given threshold T. The values of such alpha could be computed using the same criteria described in (12), (13) and using the mean of the two sub-images.

It is also possible to choose a narrower or a larger range, but in the former case the method of the invention would be carried out also on images with a reasonably fair definition, thus substantially resulting in a time loss, while in the latter case there could be images that could be sensibly improved if corrected.

Once the parameter α for the image to be processed has been chosen and once the local correction mask has been calculated, according to the method of the invention the contrast of the image is locally corrected according to equation (5), thus obtaining a first corrected image. In order to improve further the quality of the corrected image, according to the preferred embodiment, further corrections of contrast and of saturation may be carried out.

From a deeper analysis of the intensity histogram before and after the local correction proposed, it emerges that, despite a better occupation of the gray levels, the overall contrast enhancement is good but not completely satisfying. In fact, the new histogram is more spread than the original (that means that the contrast has been enhanced), it is shifted around the median values of the range but it is somewhat confined around it.

Figure 11A:
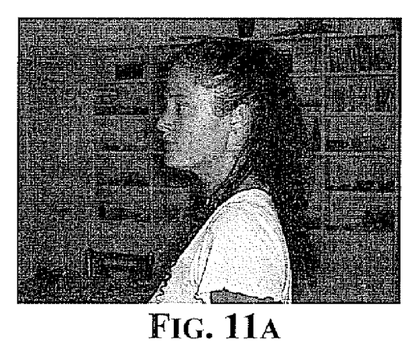
FIG. 11a shows a third picture to be corrected in accordance with the present invention.
Figure 11B:
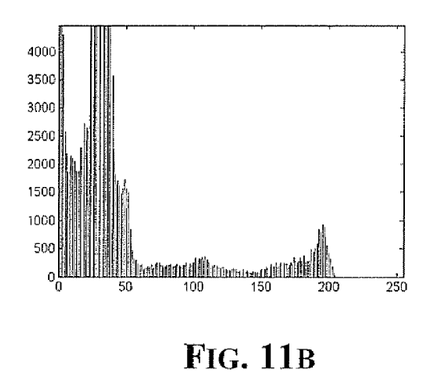
Figure 12A:
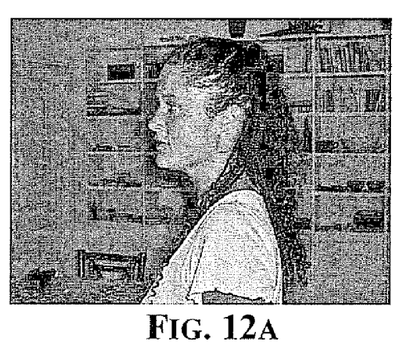
FIG. 12a is a replica of the image of FIG. 11a corrected according to a first embodiment in accordance with the present invention.
Figure 12B:
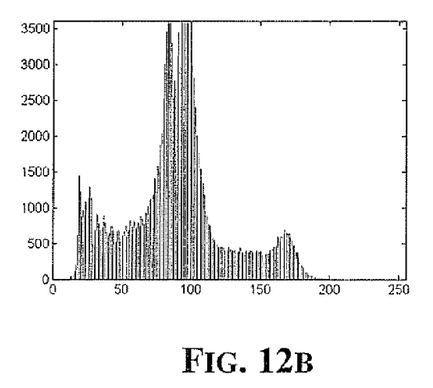

To better understand the significance of these modifications, let us refer to the input image depicted in FIG. 11a and to the corresponding image in FIG. 12a corrected with the local contrast correction method of the invention, using a sample value of α=2.5. The respective histograms of the images in FIGS. 11a and 12a are depicted in FIGS. 11b and 12b, respectively.

The corrected picture of FIG. 12a is brighter than that of FIG. 11a and the objects in the background scene are more clearly depicted than in FIG. 11a, but the image of FIG. 12a is not completely satisfying because colors appear to be desaturated, i.e., the corrected image is somewhat grayish.

From thorough studies carried out by the inventors, it resulted that any algorithm that corrects images, detects and corrects underexposed or overexposed regions by changing their pixels values, generates a final image where all the pixels values occupy the central portion of the histogram. Moreover, especially for low quality images with compression artifacts, the noise in the darkest zones is enhanced. This effect is substantially intrinsic also in the corrections carried out with equation (5).

To contrast this undesirable loss of image quality, further steps may be introduced in any contrast enhancement process, comprising in a stretching and clipping procedure. This procedure, which is well known in literature and is used sophisticated software for enhancing definition of digital images, is determined by histogram inspection and comprises detecting opportune bins of the histogram from which identifying elements (clipping) to be corrected, such to be moved toward the extreme positions of the histogram (stretching). To summarize, the clipping and stretching procedure introduces new bins and/or increases the number of bins located at the extreme positions of the histogram.

Figure 13A:
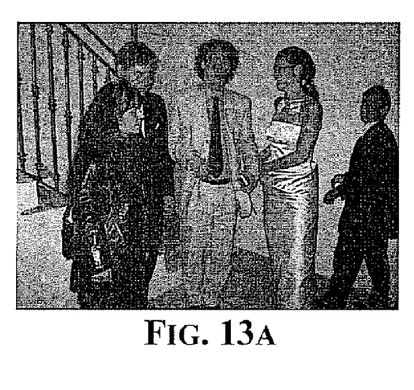
FIG. 13a shows a fourth image to be corrected in accordance with the present invention.
Figure 13B:
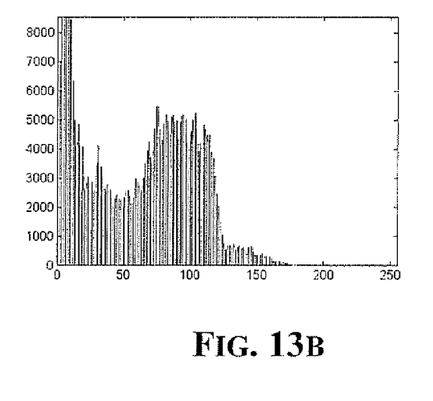

The main characteristic of these further steps is that they are image dependent. That is, the stretching and clipping depend on the properties of the image histogram and are not fixed a priori. To better understand how these steps work, let us consider the image of FIG. 13a and its relative histogram in FIG. 13b. In the image of FIG. 11a there is a dark zone that corresponds to the first 50 gray levels (bins). In the image of FIG. 13a there are dark areas that correspond to the first 30 gray levels, essentially due to the dark clothes of the people. These dark colors should be kept unchanged as much as possible.

Figure 14A:
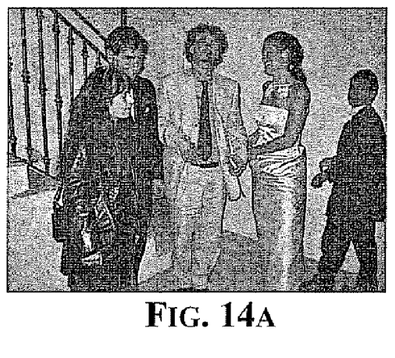
FIG. 14a is a replica of the image of FIG. 13a corrected according to a first embodiment in accordance with the present invention.
Figure 14B:
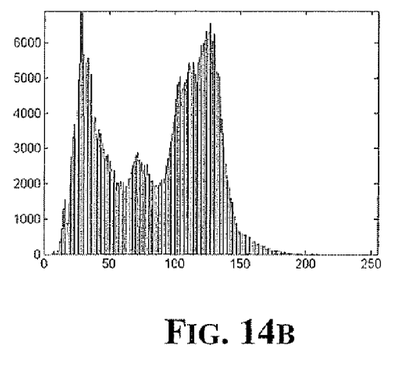

By applying equation (5) to both images, these two dark regions are made brighter, as shown in FIG. 12a and in FIG. 14a and as it may be inferred from the corresponding histograms of FIGS. 12b and 14b. For an ideal correction, it will be necessary to carry out the stretching and clipping steps in different ways for the two figures.

For FIG. 12a, it is necessary to recover only partially the dark pixels, while for the image of FIG. 14a all dark pixels of the clothes must be recovered.

To determine the strength of the stretching and thus the number of histogram entries (or histogram bins) to be clipped, it is considered how the darker regions occupy the intensity histogram before and after the correction carried out according to equation (5).

Tests carried out by the inventors consider pixels that belong to a dark zone, such as pixels of a dark suit or a dark object, as occupying a narrow and peaked group of bins of the intensity histogram. These pixels are expected to be present almost unchanged in the final corrected image.

Pixels of an underexposed background cause relatively larger (more spread) histogram peaks, and after having corrected the image, they would be present on an even wider region of the luminance histogram.

To evaluate how these dark pixels are distributed, the algorithm proceeds as follows:

the RGB input image is converted in the space of luminance Y and chrominance Cb, Cr values. This space is chosen because it is common in case of JPEG compression, but other spaces in which the luminance and the chrominance components are separated may be adopted. For example, the method may be used directly in the RGB space;

the percentage of dark pixels in the input image is computed. According to a preferred embodiment, a pixel is considered dark if its luminance Y is smaller than a first threshold $\Delta_1$ (for example, may be $\Delta_1=35$) and its chroma radius $\sqrt{(Cb-M)^2+(Cr-M)^2}$ is smaller than a second threshold $\Delta_2$ with $\Delta_1>\Delta_2$ (that, for example, may be $\Delta_2=20$).

if there are dark pixels, the number of stretched bins $b_{str}$ is evaluated as the difference between the bin corresponding to a first percentage X %, for example 30%, of dark pixels in the histogram of the output intensity, b_output$_{X\%}$, and the bin, b_input$_{X\%}$, corresponding to the same percentage in the histogram of the input luminance intensity. Thus, the greater the difference between b_output$_{X\%}$ and b_input$_{X\%}$ the greater the number of pixels that will be clipped and stretched, and vice-versa:

$$b_{str}=b\_output_{X\%}-b\_input_{X\%};$$

in the case of dark regions that must be recovered, this percentage of pixels, that the experience suggests to set at X % but that may be established at a different percentage, generally is comprised in the first bins, under a narrow peak of the histogram, together with the rest of the dark pixels. Therefore, most of these pixels are repositioned at almost their initial values;

in case of underexposed regions, the same percentage is generally comprised in a more spread peak and thus only part of the dark pixels are recovered;

if there are no dark pixels, the stretching is done for obtaining a clipping of a pre-established percentage Y % of the darkest pixels. Preferably, this percentage is set at 0.2% of the darkest pixels. Preferably, a maximum number of bins to be clipped may be pre-established. For example, this maximum value may be 50;

for the bright pixels, the stretching is done to obtain a clipping of the Y % of the brightest pixels. Obviously, this percentage and this maximum value may be varied according to the need.

To minimize the change of the color saturation between the input and the final images, especially in case of processing where only the luminance component is considered and modified, and thus in both the above described processes (contrast correction, stretching and clipping) the following formulation is applied to the RGB channels to preserve initial chrominance information, as suggested by Sakaue et al. [3]:

$$\begin{cases} R' = \frac{1}{2}\left(\frac{Y'}{Y}(R+Y) + R - Y\right) \\ G' = \frac{1}{2}\left(\frac{Y'}{Y}(G+Y) + G - Y\right) \\ B' = \frac{1}{2}\left(\frac{Y'}{Y}(B+Y) + B - Y\right) \end{cases} \quad (14)$$

wherein R, G, B, Y are the red, green blue and luminance components of the corrected image, respectively, and R', G', B' Y' are the corresponding components of the final image.

Figure 15A:
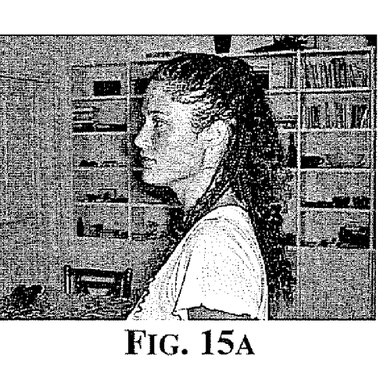
FIG. 15a is a replica of the image of FIG. 13a corrected according to the preferred embodiment in accordance with the present invention.
Figure 15B:
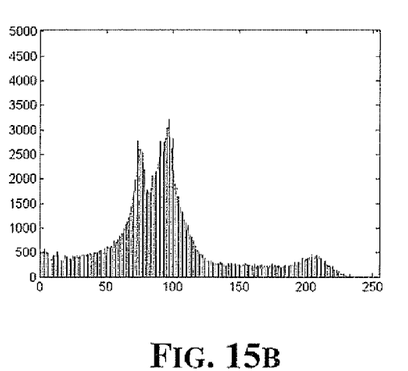
Figure 16A:
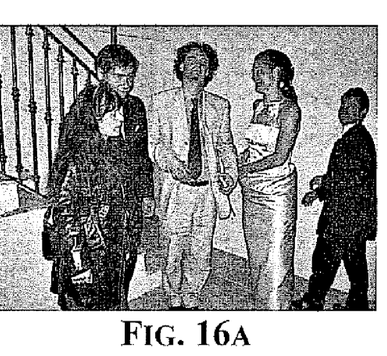
FIG. 16a is a replica of the image of FIG. 13a corrected according to the preferred embodiment in accordance with the present invention.
Figure 16B:
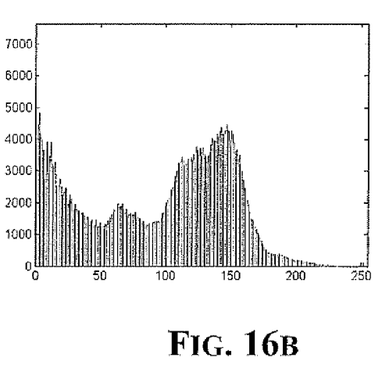

FIG. 15a depicts an image corresponding to that depicted in FIG. 11a, that has been obtained by carrying out the above steps. The image of FIG. 12a and FIG. 15b shows the corresponding luminance histogram. Similarly, FIG. 16a corresponds to FIG. 13a and has been obtained by correcting the image of FIG. 14a with the above steps FIG. 16b is the corresponding luminance histogram.

The final output images corrected according to the preferred embodiment are very satisfactory because contours of depicted persons and objects are well defined, and despite the original images may be rather dark, it is possible to identify all objects and all details of the images without noticing artifacts.

In FIG. 15a, the background library is well illuminated and well defined. In FIG. 16a, the faces of the depicted persons, such as the light clothes of the two persons are sufficiently bright, while the dark suits of the two men and the black jacket of the woman on the left side have not been faded.

REFERENCES

[1] N. Moroney, "Method and system of local colour correction using background luminance masking", U.S. Pat. No. 6,741,753.
[2] N. Moroney, "Local color correction using non-linear masking", IS&T/SID Eighth Color Imaging Conference, pp. 108-111, 2000.
[3] S. Sakaue, A. Tamura, M. Nakayama and S. Maruno, "Adaptive gamma processing of the video cameras for the expansion of the dynamic range", IEEE Trans. On Consumer Electronics, Vol. 41, pp. 555-562, 1995.
[4] W. Frei, "Image enhancement by histogram hyperbolization", Computer Graphics and Image Processing, Vol. 6, pp. 286-294, 1977.
[5] Mokrane, "A new image contrast enhancement technique based on a contrast discrimination model", *CVGIP: Graphical Models and Image Processing*, Vol. 54, pp. 171-180, 1992
[6] Y. Wang, Q. Chen and B. Zhang, "Image enhancement based on equal area dualistic sub-image histogram equalization method", IEEE Trans. on Consumer Electronics, Vol. 45, pp. 68-75, 1999.
[7] K. Chiu, M. Herf, P. Shirley, S. Swamy, C. Wang and K. Zimmerman, "Spatially nonuniform scaling functions for high contrast images", Proc. Graphics Interface'93, pp. 245-254, 1993.
[8] G. Larson, H. Rushmeier and C. Piatko, "A visibility matching tone reproduction operator for high dynamic range scenes", *IEEE Trans. Vis. And Comp. Graph*, Vol. 3, pp. 291-306, 1997.
[9] J. Tumblin and G. Turk, "LCIS: A boundary hierarchy for detail preserving contrast reduction", *SIGGRAPH* 99, pp. 83-90, 1999.
[10] S. Battiato, A. Castorina and M. Mancuso, "High dynamic range imaging for digital still camera: an overview", Journal of Electronic Imaging, Vol, 12, pp 459-469, 2003.
[11] S. Pattanik, J. Ferwerda, M. Fairchild and D. Greenberg, "A multiscale model of adaptation and spatial visual for realistic image display", SIGGRAPH 98, pp. 287-298, 1998.
[12] D. Jobson, Z. Rahman and G. Woodell, "A multiscale retinex for bridging the gap between color images and the human observation of scenes", IEEE Trans. On Image Processing, Vol. 6, pp. 965-976, 1997
[13] Z. Rahman, D. Jobson and G. Woodell, "Multiscale retinex for color image enhancement", Proc. International Conference on Image Processing, Vol. 3, pp. 1003-1006, 1996.
[14] Rizzi, C. Gatta and D. Marini, "A new algorithm for unsupervised global and local color correction", Pattern Recognition Letters, Vol. 24, pp. 1663-1677, 2003.
[15] M. Fairchild and G. Johnson, "Meet iCAM: An Image Color Appearance Model", IS&T/SID 10th Color Imaging Conference, Scottsdale, 2002.
[16] Tomasi and R. Manduchi, "Bilateral filtering for gray and color images", Proc. 1998 IEEE Int. Conf. on Computer Vision, pp. 836-846, 1998.
[17] F. Durand and J. Dorsey, "Fast bilateral filtering for the display of high-dynamic-range images", SIGGRAPH, 2002.

That which is claimed:

1. A method for correcting a luminance intensity of pixels of an input digital image for generating a corrected digital image, a luminance of each pixel being calculated as a function of the luminance of a corresponding pixel in an original image according to a parametric function, the method comprising:
generating a mask of the input digital image to be corrected according to a bilateral filtering technique;
for each pixel of the input digital image, establishing a respective value of at least one parameter of the parametric function based upon the luminance of a corresponding pixel of the mask;
establishing a number of dark pixels in the corrected digital image and in the input digital image;
if there are dark pixels in the input digital image, performing a stretching operation on the corrected digital image to have a same percentage of dark pixels as in the input digital image, then performing a clipping operation based upon a first percentage;

if there are no dark pixels in the input digital image, performing the stretching operation and the clipping operation to clip a second percentage of the darkest pixels;

establishing a number of bright pixels in the corrected digital image and in the input digital image;

if there are bright pixels in the input digital image, performing a stretching operation on the corrected digital image to have a same percentage of bright pixels as in the input digital image, then performing a clipping operation based upon the second percentage; and if there are no bright pixels in the input digital image, performing the stretching operation and the clipping operation to clip the second percentage of the brightest pixels.

2. A method according to claim 1, wherein the parametric function is a power operator of a gamma correction operation, an exponent of which is the at least one parameter.

3. A method according to claim 2, wherein the exponent is obtained by powering a real number to an exponent given by a ratio between a difference between a median luminance intensity and a value of the mask corresponding to the pixel to be corrected, and the median luminance intensity.

4. A method according to claim 3, further comprising determining the real number as a function of a threshold mean luminance intensity of the corrected digital image.

5. A method according to claim 4, wherein for the original image, the threshold mean luminance is smaller than the median luminance intensity, and the real number is a ratio between a natural logarithm of the mean luminance intensity of the input digital image to be corrected and a natural logarithm of the median luminance intensity; and if the mean luminance of the input digital image is larger than the median luminance intensity, then the real number is the ratio between the natural logarithm of $2^{n-1}$ and the natural logarithm of the mean luminance intensity of the input digital image to be corrected, n representing a bit depth of the input digital image.

6. A method according to claim 4, further comprising checking whether the real number is within a range, and if so, then leaving uncorrected the input digital image.

7. A method according to claim 6, wherein the range is from 1 to 1.2.

8. A method according to claim 1, wherein generating the mask comprises:

generating an inverted black and white replica of the input digital image to be corrected, wherein the luminance intensity of each pixel is the difference between a threshold luminance intensity and the luminance intensity of the corresponding input digital image; and low-pass bilateral filtering of the inverted black and white replica of the input digital image.

9. A method according to claim 1, further comprising shrinking the input digital image with a scale factor to analyze and estimate a strength of the correction.

10. A method according to claim 1, wherein the first percentage is 30% and the second percentage is 0.2%.

11. A method according to claim 1, wherein the input digital image is an RGB digital image; and further comprising:

correcting the color saturation of the corresponding corrected digital image according to the following formula:

$$\begin{cases} R' = \frac{1}{2}\left(\frac{Y'}{Y}(R+Y) + R - Y\right) \\ G' = \frac{1}{2}\left(\frac{Y'}{Y}(G+Y) + G - Y\right) \\ B' = \frac{1}{2}\left(\frac{Y'}{Y}(B+Y) + B - Y\right) \end{cases}$$

wherein R, G, B, Y are the red, green blue and luminance components of the corrected digital image, respectively, and R', G', B'Y' are the corresponding components of the final image.

12. A method for correcting a luminance intensity of pixels of an input digital image for generating a corrected digital image, a luminance of each pixel being calculated as a function of the luminance of a corresponding pixel in an original image according to a parametric function, the method comprising:

generating a mask of the input digital image to be corrected according to a bilateral filtering technique by at least generating an inverted black and white replica of the input digital image to be corrected, wherein the luminance intensity of each pixel is a difference between a threshold luminance intensity and the luminance intensity of the corresponding input digital image, and filtering the inverted black and white replica of the input digital image;

for each pixel of the input digital image, establishing a respective value of at least one parameter of the parametric function based upon the luminance of a corresponding pixel of the mask, the parametric function being a power operator of a gamma correction operation, an exponent of which is the at least one parameter;

establishing a number of dark pixels in the corrected digital image and in the input digital image;

if there are dark pixels in the input digital image, performing a stretching operation on the corrected digital image to have a same percentage of dark pixels as in the input digital image, then performing a clipping operation based upon a first percentage;

if there are no dark pixels in the input digital image, performing the stretching operation and the clipping operation to clip a second percentage of the darkest pixels;

establishing a number of bright pixels in the corrected digital image and in the input digital image;

if there are bright pixels in the input digital image, performing a stretching operation on the corrected digital image to have a same percentage of bright pixels as in the input digital image, then performing a clipping operation based upon the second percentage; and if there are no bright pixels in the input digital image, performing the stretching operation and the clipping operation to clip the second percentage of the brightest pixels.

13. A method according to claim 12, wherein the threshold luminance intensity corresponds to a maximum luminance intensity.

14. A method according to claim 12, wherein the exponent is obtained by powering a real number to an exponent given by a ratio between a difference between a median luminance intensity and a value of the mask corresponding to the pixel to be corrected, and the median luminance intensity.

15. A method according to claim 14, further comprising determining the real number as a function of a threshold mean luminance intensity of the corrected digital image.

16. A method according to claim 15, wherein for the original image, the threshold mean luminance is smaller than the median luminance intensity, and the real number is a ratio between a natural logarithm of the mean luminance intensity of the input digital image to be corrected and a natural logarithm of the median luminance intensity; and if the mean luminance of the input digital image is larger than the median luminance intensity, then the real number is the ratio between the natural logarithm of $2^{n-1}$ and the natural logarithm of the mean luminance intensity of the input digital image to be corrected, n representing a bit depth of the input digital image.

17. A method according to claim 15, further comprising checking whether the real number is within a range, and if so, then leaving uncorrected the input digital image.

18. A method according to claim 12, wherein the first percentage is 30% and the second percentage is 0.2%.

19. A computer-readable medium having computer-executable instructions for causing a computer to correct a luminance intensity of pixels of an input digital image by generating a corrected digital image, the luminance of each pixel being calculated as a function of the luminance of a corresponding pixel in an original image according to a parametric function, the computer to perform steps comprising:
generating a mask of the input digital image to be corrected according to a bilateral filtering technique;
for each pixel of the input digital image, establishing a respective value of at least one parameter of the parametric function based upon the luminance of a corresponding pixel of the mask;
establishing a number of dark pixels in the corrected digital image and in the input digital image;
if there are dark pixels in the input digital image, performing a stretching operation on the corrected digital image to have a same percentage of dark pixels as in the input digital image, then performing a clipping operation based upon a first percentage;
if there are no dark pixels in the input digital image, performing the stretching operation and the clipping operation to clip a second percentage of the darkest pixels;
establishing a number of bright pixels in the corrected digital image and in the input digital image;
if there are bright pixels in the input digital image, performing a stretching operation on the corrected digital image to have a same percentage of bright pixels as in the input digital image, then performing a clipping operation based upon the second percentage; and
if there are no bright pixels in the input digital image, performing the stretching operation and the clipping operation to clip the second percentage of the brightest pixels.

20. A computer-readable medium according to claim 19, wherein the parametric function is a power operator of a gamma correction operation, an exponent of which is the at least one parameter.

21. A computer-readable medium according to claim 20, wherein the exponent is obtained by powering a real number to an exponent given by a ratio between a difference between a median luminance intensity and a value of the mask corresponding to the pixel to be corrected, and the median luminance intensity.

22. A computer-readable medium according to claim 21, further comprising determining the real number as a function of a threshold mean luminance intensity of the corrected digital image.

23. A computer-readable medium according to claim 22, wherein for the original image, the threshold mean luminance is smaller than the median luminance intensity, and the real number is a ratio between a natural logarithm of the mean luminance intensity of the input digital image to be corrected and a natural logarithm of the median luminance intensity; and if the mean luminance of the input digital image is larger than the median luminance intensity, then the real number is the ratio between the natural logarithm of $2^{n-1}$ and the natural logarithm of the mean luminance intensity of the input digital image to be corrected, n representing a bit depth of the input digital image.

24. A computer-readable medium according to claim 22, further comprising checking whether the real number is within a range, and if so, then leaving uncorrected the input digital image.

25. A computer-readable medium according to claim 24, wherein the range is from 1 to 1.2.

26. A computer-readable medium according to claim 19, wherein generating the mask comprises:
generating an inverted black and white replica of the input digital image to be corrected, wherein the luminance intensity of each pixel is the difference between a threshold luminance intensity and the luminance intensity of the corresponding input digital image; and
low-pass bilateral filtering of the inverted black and white replica of the input digital image.

27. A computer-readable medium according to claim 19, further comprising shrinking the input digital image with a scale factor to analyze and estimate a strength of the correction.

28. A computer-readable medium according to claim 19, wherein the first percentage is 30% and the second percentage is 0.2%.

29. A computer-readable medium according to claim 19, wherein the input digital image is an RGB digital image; and further comprising:
correcting the color saturation of the corresponding corrected digital image according to the following formula:

$$\begin{cases} R' = \frac{1}{2}\left(\frac{Y'}{Y}(R+Y) + R - Y\right) \\ G' = \frac{1}{2}\left(\frac{Y'}{Y}(G+Y) + G - Y\right) \\ B' = \frac{1}{2}\left(\frac{Y'}{Y}(B+Y) + B - Y\right) \end{cases}$$

wherein R, C, B, Y are the red, green blue and luminance components of the corrected digital image, respectively, and R', G', B'Y' are the corresponding components of the final image.

30. An apparatus comprising:
an input configured to receive an input digital image; and
a processor configured to correct a luminance intensity of pixels of the input digital image for generating a corrected digital image, a luminance of each pixel being calculated as a function of the luminance of a corresponding pixel in an original image according to a parametric function, the correcting comprising
generating a mask of the input digital image to be corrected according to a bilateral filtering technique,
for each pixel of the input digital image, establishing a respective value of at least one parameter of the parametric function based upon the luminance of a corresponding pixel of the mask, the parametric function being a power operator of a gamma correction operation, an exponent of a gamma correction operation, an exponent of which being the at least one parameter;

obtaining the exponent by powering a real number to an exponent given by a ratio between a difference to an exponent given by a ratio between a difference between a median luminance intensity and a value of the mask corresponding to the pixel to be corrected, and the median luminance intensity; and determining the real number as a function of a threshold mean luminance intensity of the corrected digital image;

for the original image, the threshold mean luminance being smaller than the median luminance intensity, and the real number being a ratio between a natural logarithm of the mean luminance intensity of the input digital image to be corrected and a natural logarithm of the median luminance intensity;

if the mean luminance of the input digital image is larger than the median luminance intensity, then the real number is the ratio between the natural logarithm of $2^{n-1}$ and the natural logarithm of the mean luminance intensity of the input digital image to be corrected, n representing a bit depth of the input digital image.

31. A method for correcting a luminance intensity of pixels of an input digital image for generating a corrected digital image, a luminance of each pixel being calculated as a function of the luminance of a corresponding pixel in an original image according to parametric function, the method comprising:

generating a mask of the input digital image to be corrected according to a bilateral filtering technique;

for each pixel of the input digital image, establishing a respective value of at least one parameter of the parametric function based upon the luminance of a corresponding pixel of the mask, the parametric function being a power operator of a gamma correction operation, an exponent of which is the at least one parameter;

obtaining the exponent by powering a real number to an exponent given by a ratio between a difference between a median luminance intensity and a value of the mask corresponding to the pixel to be corrected, and the median luminance intensity; and determining the real number as a function of a threshold mean luminance intensity of the corrected digital image;

in the original image, the threshold mean luminance being smaller than the median luminance intensity, and the real number being a ratio between a natural logarithm of the mean luminance intensity of the input digital image to be corrected and a natural logarithm of the median luminance intensity;

if the mean luminance of the input digital image is larger than the median luminance intensity, then the real number is the ratio between the natural logarithm of $2^{n-1}$ and the natural logarithm of the mean luminance intensity of the input digital image to be corrected, n representing a bit depth of the input digital image.

32. A method for correcting a luminance intensity of pixels of an input digital image for generating a corrected a digital image, a luminance of each pixel being calculated as a function of the luminance of a corresponding pixel in an original image according to a parametric function, the method comprising:

generating a mask of the input digital image to be corrected according to a bilateral filtering technique; and for each pixel of the input digital image, establishing a respective value of at least one parameter of the parametric function based upon the luminance of a corresponding pixel of the mask, the parametric function being a power operator of a gamma correction operation, an exponent of which is the at least one parameter;

obtaining the exponent by powering a real number to an exponent given by a ratio between a difference between a median luminance intensity and a value of the mask corresponding to the pixel to be corrected, and the median luminance intensity;

determining the real number as a function of a threshold mean luminance intensity of the corrected digital image; and checking whether the real number is within a range between a value of greater than 1 and 1.2, and if so, then leaving uncorrected the input digital image.

33. A computer-readable medium having computer-executable instructions for causing a computer to correct a luminance intensity of pixels of an input digital image by generating a corrected digital image, the luminance of each pixel being calculated as a function of the luminance of a corresponding pixel in an original image according to a parametric function, the computer to perform steps comprising:

generating a mask of the input digital image to be corrected according to a bilateral filtering technique; and for each pixel of the input digital image, establishing a respective value of at least one parameter of the parametric function based upon the luminance of a corresponding pixel of the mask, the parametric function being a power operator of a gamma correction operation, an exponent of which is the at least one parameter;

obtaining the exponent by powering a real number to an exponent give by a ratio between a difference between a median luminance intensity and a value of the mask corresponding to the pixel to be corrected, and the median luminance intensity; and determining the real number as a function of a threshold mean luminance intensity of the corrected digital image;

for the original image, the threshold mean luminance being smaller than the median luminance intensity, and the real number being a ratio between a natural logarithm of the mean luminance intensity of the input digital image to be corrected and a natural logarithm of the median luminance intensity;

if the mean luminance of the input digital image is larger than the median luminance intensity, them the real number is the ratio between the natural logarithm of the $2^{n-1}$ and the natural logarithm of the mean luminance intensity of the input digital image to be corrected, n representing a bit depth of the input digital image.

34. A computer-readable medium having computer-executable instructions for causing a computer to correct a luminance intensity of pixel of an input digital image by generating a corrected digital image, the luminance of each pixel being calculated as a function of the luminance of a corresponding pixel in an original image according to a parametric function, the computer to perform steps comprising:

generating a mask of the input digital image to be corrected according to a bilateral filtering technique; and for each pixel of the input digital image, establishing a respective value of at least one parameter of the parametric function based upon the luminance of a corresponding pixel of the mask, the parametric function being a power operator of a gamma correction operation, an exponent of which is the at least one parameter;

obtaining the exponent by powering a real number to an exponent given by a ratio between a difference between a median luminance intensity and a value of the mask corresponding to the pixel to be corrected, and the median luminance intensity;

determining the real number as a function of a threshold mean luminance intensity of the corrected digital image; and checking whether the real number is within a range between a value of greater than 1 and 1.2, and if so, then leaving uncorrected the input digital image.

* * * * *

UNITED STATES PATENT AND TRADEMARK OFFICE
CERTIFICATE OF CORRECTION

| | |
|---|---|
| PATENT NO. | : 7,881,554 B2 |
| APPLICATION NO. | : 11/422208 |
| DATED | : February 1, 2011 |
| INVENTOR(S) | : Castorina et al. |

It is certified that error appears in the above-identified patent and that said Letters Patent is hereby corrected as shown below:

Column 1, Line 16    Delete: "technique"
Insert: --techniques--

Column 6, Line 64    Delete:

$$"k(i,j) = \sum_{p=i-K}^{i+K} \sum_{q=j-K}^{j+K} e^{\left\{-\frac{1}{\sigma_1^2}\left[(i-p)^2+(j-q)^2\right]\right\}} e^{\left\{-\frac{1}{2\sigma_2^2}[I_{inv}(i,j)-I_{inv}(p,q)]^2\right\}}"$$

Insert:

$$k(i,j) = \sum_{p=i-K}^{i+K} \sum_{q=j-K}^{j+K} e^{\left\{-\frac{1}{2\sigma_1^2}\left[(i-p)^2+(j-q)^2\right]\right\}} e^{\left\{-\frac{1}{2\sigma_2^2}[I_{inv}(i,j)-I_{inv}(p,q)]^2\right\}}$$

Column 7, Line 14    Delete: "$K = fix(\alpha \times \sigma)$"
Insert: --$K = fix(\alpha \times \sigma_1)$--

Column 7, Line 59    Delete: "$v_1+1$"
Insert: --$\sigma_1+1$--

Column 8, Line 45    Delete: "towards to M"
Insert: --towards M--

Column 8, Line 49    Delete: "a may"
Insert: --$\alpha$ may--

Column 8, Line 56    Delete: "a on"
Insert: --$\alpha$ on--

Signed and Sealed this
Twelfth Day of July, 2011

David J. Kappos
*Director of the United States Patent and Trademark Office*

CERTIFICATE OF CORRECTION (continued)
U.S. Pat. No. 7,881,554 B2

| | |
|---|---|
| Column 8, Line 59 | Delete: "(1,5, 2" <br> Insert: --(1.5, 2-- |
| Column 9, Line 55 | Delete: "sophisticated" <br> Insert: --in sophisticated-- |
| Column 11, Line 30 | Delete: "green blue" <br> Insert: --green, blue-- |
| Column 14, Line 13 | Delete: "B' Y'" <br> Insert: --B', Y'-- |
| Column 16, Line 50 | Delete: "R, C," <br> Insert: --R, G, -- |
| Column 16, Line 50 | Delete: "green blue" <br> Insert: --green, blue-- |
| Column 16, Line 52 | Delete: "B' Y'" <br> Insert: --B', Y'-- |
| Column 17, Line 29 | Delete: "to parametric" <br> Insert: --to a parametric-- |
| Column 17, Line 59 | Delete: "corrected a digital" <br> Insert: --corrected digital-- |
| Column 18, Line 32 | Delete: "give" <br> Insert: --given-- |